Sept. 6, 1966 S. A. CANFIELD 3,271,485
METHOD AND APPARATUS FOR PRODUCING BONDED FIBROUS PRODUCTS
Filed Feb. 6, 1963
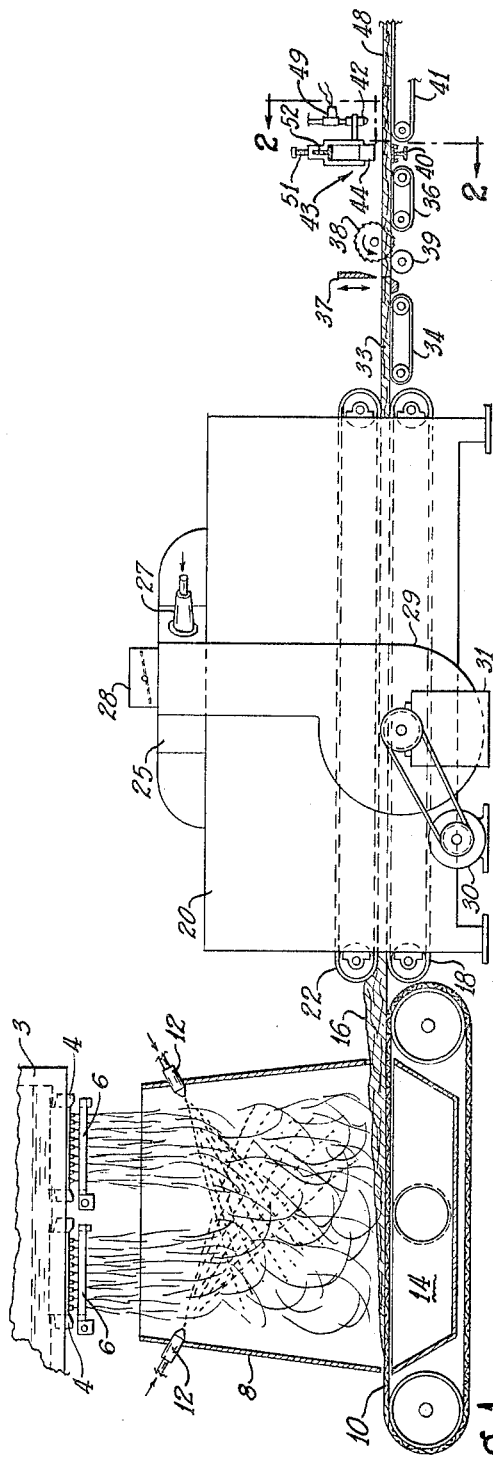
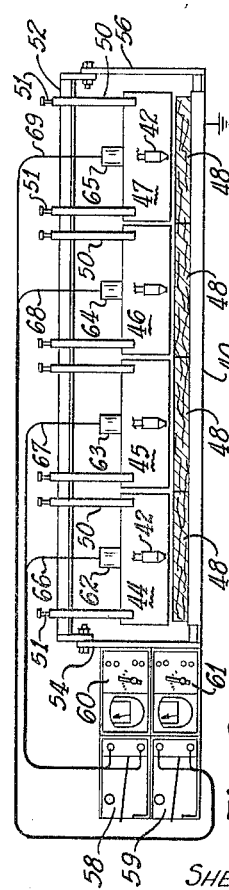
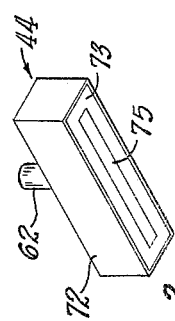
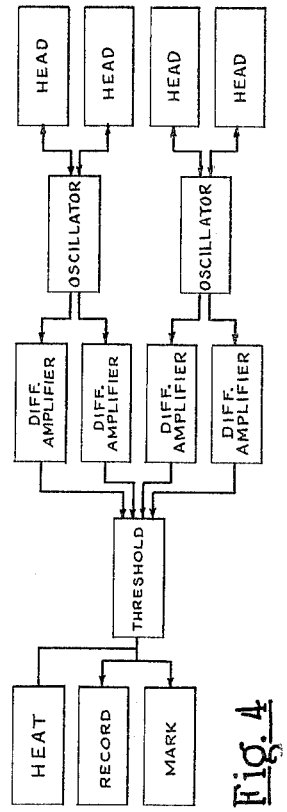
INVENTOR
SHELDON A. CANFIELD
BY
ATTORNEYS United States Patent Office 3,271,485
Patented Sept. 6, 1966

3,271,485
METHOD AND APPARATUS FOR PRODUCING BONDED FIBROUS PRODUCTS
Sheldon A. Canfield, Newark, Ohio, assignor to Owens-Corning Fiberglas Corporation, a corporation of Delaware
Filed Feb. 6, 1963, Ser. No. 256,566
5 Claims. (Cl. 264—26)

This invention relates generally to methods and apparatus pertaining to the setting or curing of heat activated, moisture-carrying binders of fibrous masses. The invention pertains primarily to determining the moisture content due to incomplete curing of the binding agent of such masses through the use of capacitance apparatus, and additionally to means actuated by the moisture detection for then curing the binding agent or disposing of the portion of such fibrous masses or units thereof in which uncured binder has been found to exist.

The methods and apparatus of the invention have special utility in connection with packs of mineral wool and are herein illustrated and described in connection with the processing of fibrous glass packs or webs, and individual units thereof.

Glass fibers are produced by a number of well-established systems, all using blasts of air, steam or combustion gases to attenuate fine streams of molten glass into thread-like fibers having diameters ranging from three to one hundred, hundred thousandths of an inch.

For textile purposes the fibers may be of continuous lengths or formed into strands from staple in lengths varying between eight to sixteen inches. In the production of glass wool, from which bats, rolls and boards are fabricated and to which this invention more directly pertains, the fibers generally averaging less than eight inches long are collected in a fleecy mass upon a conveyor moving across the bottom of a glass fiber forming hood. When it is desired to integrate the resultant fibrous mass a heat settable binder, such as a water suspension of phenol formaldehyde, is dispersed among the fibers as they are gathered on the conveyor. The final product may retain the low density of the original pack or may be compacted to semi-rigid or rigid board form. The latter type of compacted pack is cut into variously sized panels.

Such masses of fibrous glass have superior qualities for thermal insulation and sound absorption because of the weak conductive paths at the minute contact points between the cylindrical fibers, and due to the multitude of air cells between and the thin air layers around the fine fibers. This exceptional inherent resistance to the penetration and conduction of heat has been an obstacle in connection with the drying and heat setting or polymerization of the preferred resin binders, such as the phenols and ureas.

A phenol formaldehyde resin binder, which has had wide use for this purpose, polymerizes in a matter of seconds upon reaching a curing temperature between 300° and 350° F. However, this binder is generally introduced in an aqueous vehicle and the removal of the water by vaporization consumes a great amount of heat which must precede the application of the final heat increment required to raise the basic resin constituent to the setting temperature.

A very effective arrangement for curing the binder of fibrous glass packs involving the forced movement of hot air through the packs in ovens of extensive length, has been in use for some years in the production of a vast quantity of such products. Soaking heat applications in static hot air ovens, although slower, have also been used with success. Both methods are time-consuming, when considering the operation as a whole, starting with the formation of the glass fibers and concluding with the packaging of the final product.

With the conventional hot air curing of fibrous glass packs there may be quite a range in the amount of cure given the dispersed particles of the binder.

The glass wool is generally processed on continuously moving conveyors and is often under compression when being transported through binder curing zones. The binder distribution may not be uniform and may have more or less of a water constituent. Also, the density of the pack is greater in some areas than in others. Then too the glass fiber packs are produced in various thicknesses. These, as well as the particular antipathy of glass wool to heat reception and conduction, are factors which contribute to irregular drying and curing of the binder.

Through this lack of uniform setting, the full binding power of which the binder is capable is not always secured, and the strength of the batt, board or other final product may be considerably below what is would be with complete curing. This deficiency has been difficult to overcome and not easily determined by inspection.

It is a principal object of this invention to provide a method and apparatus utilizing capacitance apparatus for detecting wet or unset binder in moving masses of thermal insulating fibrous masses.

A further object of the invention is the provision of means for further curing or otherwise handling the particular fibrous stock in which wet binder is found.

These and other objects and advantages of the invention will be more apparent upon reading the following description with reference to the accompanying drawing in which:

FIGURE 1 is a side elevation, partly in section, of equipment for producing bonded fibrous mat and includes apparatus embodying this invention;

FIGURE 1a is a continued portion of the equipment of FIGURE 1 showing a supplemental oven associated with the conveyor;

FIGURE 2 is a front elevation on an enlarged scale of a series of capacitors and associated equipment which is positioned across the production line of FIGURE 1 and as viewed from the line 2—2 thereof;

FIGURE 3 is an isometric view of the upper plate assembly of one of the capacitors of FIGURE 2; and FIGURE 4 is a schematic showing of the capacitors and associated equipment in which the various elements are identified by labeled rectangles with the direction of the electrical current or sequence of action indicated by arrow-headed lines.

Referring to the drawings in more detail, production equipment of FIGURE 1 begins with the forehearth 3 of a glass melting tank. The molten glass flows from the forehearth in fine streams out orifices in bushings 4. The threads of glass are drawn downwardly and attenuated into fibers by air or steam jets from manifolds 6. The fibers are of a diameter preferably between fifteen and thirty, hundred thousandths of an inch for the fibrous bodies to which this invention particularly relates.

As the fibers fall within hood 8 toward the receiving conveyor 10, intermingled therewith are discrete particles of an uncured binding agent, preferably a phenol formaldehyde resin in an aqueous vehicle. The binder solution or suspension is projected among the falling fibers by air atomizing nozzles 12 extending through the walls of hood 8. The glass fibers, impregnated with the binder, collect in a pack upon the pervious, receiving conveyor 10, assisted by the suction chamber 14 into which air is drawn down through the conveyor.

The fibrous glass web or pack 16, thus formed, commonly has a width of four feet and a thickness ranging up to eight inches or more, as controlled by the speed of the conveyor and the production rate of the fibers. The thickness is set to fit the specifications of the final product.

The continuous pack 16 is advanced upon receiving conveyor 10 for delivery to the following foraminous conveyor 18. The latter is a woven wire belt, but may be of open weave fabric or perforated belting, for instance, of silicone rubber composition.

The conveyor 18 carries the binder impregnated pack 16 through the curing oven 20. Here the pack is compressed upon the conveyor 18 by upper conveyor 22, which is also foraminous to permit the downward passage therethrough of heated air for drying and curing the binder of the pack.

A suitable gas burner 27 is mounted to project into the head portion 25 of the oven. A constant circulation of air is maintained by the blower 29 driven by the motor 30. The air is drawn from beneath the conveyor 18 into the blower and then down thru the head portion 25 of the oven. The air may be heated to a temperature between 450° and 500° F. and may flow at the rate of one hundred feet per minute through the compressed pack. A certain controlled portion of the air may be exhausted through exhaust stack 28 and be replaced by fresh air through inlet 31.

The distribution of the resin in aqueous solution among the glass fibers is usually uneven, as previously discussed, with some spots of the binder containing more water than do others. The average water content may be as high as fifty percent of the pack, by weight.

Air at the temperature specified will usually dry and set the binder component to a generally satisfactory degree if the oven 20 is of sufficient length. Upon leaving the oven the compressed pack 33 travels over short conveyors 34 and 36. Between these conveyors are mounted a crosswise shearing knife 37 and slitting saws 38, with the underside of the pack supported by roller 39 and by a plate cooperating with the knife 37.

The rectangular panels 48 into which the compressed pack is thus divided proceed from conveyor 36 past the moisture detecting and reporting assembly 43 to conveyor 41. Immediately following the assembly 43 are spray nozzles 42 operated by solenoid valves 49 for applying markings on any panels in which excessive moisture is discovered.

The detecting mechanism functions through the conversion of minute changes in capacitance to large analogous output voltages. These are interpretable and recordable as quite exact readings of the moisture content.

As shown in FIGURE 2, assembly 43 includes a narrow skid plate 40, which in this embodiment is four inches wide, whose top surface is co-planar with conveyors 36 and 41. This plate is the ground element of a series of capacitors. For conductivity and to withstand the scratching action of the panels 48 moving thereover, plate 40 should be either aluminum, plated with hard chrome, or composed of a copper beryllium alloy.

Positioned closely above the panels 48 and overlying the plate 40 are four aligned upper plate assemblies or heads 44, 45, 46 and 47, which together have an overall width of four inches and which individually would be approximately one foot long for a conveyor width of four feet.

These upper plate assemblies or heads, are suspended by a series of inverted U shaped hangers 50 from a cross rod 52, to which they are held by adjustable screws 51. The cross rod 52 is mounted on a pair of uprights 54 and 56.

To show the construction of the plate assemblies, an enlarged perspective view of the plate assembly 44 is presented in FIGURE 3. Included in this assembly are a probe 62, a metal casing 72, an insulating plastic 73, and a hot plate 75 supported by the insert 73. Each plate 75 in this embodiment is five-eighths of an inch wide and twelve inches long. The probe 62 houses a capacity sensitive element which in this embodiment is a T-42 ionization transducer manufactured by The Decker Corporation.

An oscillator-generated high voltage signal of 250-kilocycle frequency is applied across the transducer through externally attached electrodes. This causes ionization of the gas contained within the transducer envelope. A small portion of this high frequency excitation appears across a reference capacitor, and across the capacitor comprising the hot plate 75 of the plate assembly 44 and the grounded skid plate 40. The reference capacitor and hot plate 75 are connected to opposite electrodes of the transducer.

When an A.C. voltage variation occurs between the two electrodes (due to the moisture content of a fibrous panel passing over skid plate 40), a difference in migration of the electrons in the gas occurs, giving rise to a D.C. potential difference between the electrodes. This is very much larger than the A.C. signal. A D.C. voltage difference of as much as thirty volts may be obtained without amplification. The transducer thus converts the capacitance variation due to the presence of moisture to an analogous voltage signal.

From oscillators 58 and 59 a high frequency current is delivered to the transducer probes 62, 63, 64 and 65 of the plate assemblies or heads 44 through 47. Electrical lines 66 and 67 lead from the oscillator 58 to plate assemblies 44 and 45 while lines 68 and 69 similarly lead from oscillator 59 to plate assemblies 46 and 47.

A frequency of two hundred and fifty kilocycles has proved suitable for the purpose of this invention. Quite satisfactory results may be obtained with other frequencies particularly those of a higher range but these are not usually found necessary. In this embodiment of the invention the capacitor of each plate assembly such as 44 and the ground plate 40 has a capacity between six and forty micro-microfarads.

As indicated in the schematic drawing of FIGURE 4, each upper plate assembly or head (44, 45, 46 and 47) receives a high frequency charging current from an oscillator (58, 59). Any change in the dielectric field between any hot plate 75 and the grounded skid plate 40 caused by the interception of a moisture carrying panel 48 is passed back through the associated oscillator and a differential amplifier (60, 61).

If of predetermined magnitude the change of dielectric capacity, as interpreted in D.C. voltage, is transferred through the threshold control to be recorded, and through an appropriate relay and the solenoid valve 49 actuates a spray marking nozzle 42. The latter projects a spot of coloring material on the panel 28 containing the moisture affecting the dielectric field. The threshold magnitude may, for instance, be set at plus or minus three-tenths of a volt.

Instead of actuating a marking device such as the spray nozzle 42, the signal passing through the threshold may be utilized to operate an ejecting device to remove the faulty panel from the conveyor. However, a marked panel is easily discarded or placed on a supplemental heating conveyor by an attendant stationed along the production line.

By having a multiple threshold with several points of reaction, the spray nozzle 42 may be controlled through varied action of the solenoid valve 49 to deposit different sizes of spot markings to denote different levels of moisture content. This makes it possible to grade the panels into groups, the panels of one of which may have a low moisture content and be suitable for processing through a supplemental heating zone for complete drying and curing, while it may be desirable to scrap those of another group in which excessive moisture is indicated.

The recording device is desirably set to count the undried panels and to show which longitudinal line of panels of the several carried by the conveyors such panels are in. When the occurrence of moisture is concentrated in the panels of a certain line, the application of the binder in hood 8 may then be adjusted for the purpose of attaining more uniform distribution, or the drying air flow through the oven 20 may be directed more strongly against the area of the conveyor on which that particular line of panels travels.

By supplying sufficient current to the upper electrodes or hot plates 75, and with the energy of the dielectric field naturally concentrated in any moist areas of the fibrous glass stock of a traveling continuous mat or panels in which the mat is divided, a drying of the moisture is effected. With the hot plates 75 having a comparatively large area considerable moisture may thus be removed. Accordingly, in material having a low moisture content the binder will be dried and cured.

With such an arrangement the threshold would be raised to record and mark areas or panels having greater moisture than it is predetermined would be removed by the dielectric field.

Instead of removing panels which may be economically dried by additional heat treatment, a supplemental oven 80, as shown in FIGURE 1a and identified by the rectangle labeled "Heat" in the schematic showing of FIGURE 4, may be placed over the path of conveyor 41 and be actuated through the moisture detector 43, a timing device, relays, and solenoid operated dampers to apply the necessary extra drying heat to the panels. The oven is divided, in this instance, into four compartments across the conveyor by partitions such as 82 whereby the heat may be concentrated upon panels of any indicated longitudinal line or lines of panels traveling on the conveyor.

As may be perceived from the foregoing description and disclosed by the accompanying drawings, the method and apparatus of this invention involve several basic features with various modifications and supplemental features.

Of principal importance is the dielectric means for detecting and reporting the presence of a certain minimum amount of moisture in a body of binder impregnated fibrous glass.

The marking of the portion of the body or of a unit thereof (such as a panel 48) found to contain an undesirable amount of moisture is of particular value in maintaining the quality of product as it enables the defective material to be later identified for removal or for corrective treatment.

The invention also encompasses the recording of the location and frequency of moisture laden areas whereby steps may be taken to minimize recurrences by adjusting the preceding processing operation.

Another important feature is the utilization of a dielectric field to remove moisture to a certain degree and simultaneously report moisture laden areas, for possible later treatment.

Other features of the invention include the multiple array across a conveyor of moisture detectors and marking devices; the particular construction of the capacitors; the combination of several amplitudes of actuating thresholds; the sequence of electrical and processing steps; and the subsequent automatic application of heat to areas or units identified as moisture laden.

Various changes and modifications, which are not specifically referred to herein, and which may be readily apparent to those skilled in the arts involved, likely come within the scope of the accompanying claims.

I claim:

1. The method of producing bonded panels of fibrous glass which comprises forming fibrous glass, gathering the fibrous glass in the form of panels with a heat settable binder carried in water dispersed therethrough, the binder being settable after removal by heat of the water component, said water component being normally present in a volume removable by a predetermined amount of heat, moving the panels through a dielectric field, marking the panels by projecting coloring matter thereon when the energy consumption of the dielectric field reaches a magnitude indicating the presence of an excessive volume of water requiring extra heat above the predetermined amount for removal, and subsequently applying extra heat to such panels to remove the excessive volume of water.

2. A method for producing a bonded panel of fibrous glass which comprises forming fibrous glass, gathering the fibrous glass in the form of a panel with a binder carried in water dispersed through the panel, said binder being heat settable after removal by heat of the water component, moving the panel through an oven to remove the water component and to set the binder, then moving the panel in a path through the dielectric fields of a plurality of capacitors placed in side-to-side relation across said path, and when the electrical charge of any one of said capacitors increases to a magnitude to indicate the presence of an excessive amount of water remaining in the particular portion of the panel passing through the said one of said capacitors, applying an identifying mark upon said particular portion of the panel.

3. A method according to claim 2 in which the dielectric fields are provided with sufficient size and energy to heat and remove a portion of the water component.

4. Apparatus for producing a panel of bonded fibrous glass which includes means for forming fibrous glass, means gathering the fibrous glass in panel form with a binder carried in water dispersed through the panel, a water volatilizing and binder curing heating oven, conveyor means for transporting the panel through the oven and along a path beyond the oven, a plurality of capacitors in side-to-side arrangement across said path whereby a different portion of the panel passes through the dielectric field of each of such capacitors, means separately reporting any change in the electrical charge of any capacitor which is of such magnitude as to indicate the presence of an excessive amount of water remaining in the particular portion of the panel passing through the dielectric field of said capacitor, and marking devices comprising spray nozzles for applying an identifying mark upon the panel, one of said devices being associated with each capacitor and actuated by a change of electrical charge of the capacitor due to an excessive amount of water in the portion of the panel passing through the respective dielectric field.

5. Apparatus for producing a bonded panel of fibrous glass which includes means for forming fibrous glass, means for gathering the fibrous glass in the form of a panel with a heat settable binder carried in water dispersed through the panel, an oven for removing the water and setting the binder, a conveyor for transporting the panel through the oven, a capacitor positioned across the path of the panel beyond the oven whereby the panel passes through the dielectric field of the capacitor, means reporting any change in the electrical charge of the capacitor which is of such magnitude as to indicate the presence of water remaining in the panel, and means actuated by the reporting means marking the panel when the presence of remaining water is so indicated.

References Cited by the Examiner

UNITED STATES PATENTS

| | | | |
|---|---|---|---|
| 2,231,457 | 2/1941 | Stephen. | |
| 2,331,145 | 10/1943 | Slayter | 264—109 XR |
| 2,655,458 | 10/1953 | Collins | 264—109 |
| 2,697,254 | 12/1954 | Gordon | 264—115 |
| 2,782,367 | 2/1957 | Dallas | 324—61 |
| 2,822,573 | 2/1958 | Wasniewski et al. | |
| 2,920,272 | 1/1960 | Erdman et al. | 324—61 |
| 3,004,878 | 10/1961 | Tomlinson | 264—116 XR |
| 3,019,897 | 2/1962 | Barber et al. | 324—61 XR |
| 3,072,960 | 1/1963 | Smythe et al. | |

OTHER REFERENCES 1,042,447, October 1958, German printed application (Schwamborn).

ALEXANDER H. BRODMERKEL, *Primary Examiner.*

P. E. ANDERSON, *Assistant Examiner.*